United States Patent [19]

Pettye

[11] 4,152,125
[45] May 1, 1979

[54] DRILLING FLUID PROCESSING SYSTEM

[75] Inventor: Jack C. Pettye, Houston, Tex.

[73] Assignee: Dresser Industries, Inc., Dallas, Tex.

[21] Appl. No.: 867,744

[22] Filed: Jan. 9, 1978

[51] Int. Cl.² .............................................. B01D 19/00
[52] U.S. Cl. ...................................... 55/192; 417/361
[58] Field of Search ......................... 55/166, 169, 192; 417/360, 361

[56] References Cited

U.S. PATENT DOCUMENTS

| | | | |
|---|---|---|---|
| 1,712,012 | 5/1929 | Traudt | 417/361 |
| 2,346,951 | 4/1944 | Temple | 417/361 X |
| 2,749,846 | 6/1956 | Karver | 417/360 X |
| 2,907,277 | 10/1959 | Lessly | 417/361 X |
| 3,213,594 | 10/1965 | Long | 55/169 |
| 3,363,404 | 1/1968 | Griffin et al. | 55/192 X |
| 3,769,779 | 11/1973 | Liljestrand | 55/166 |
| 4,046,528 | 9/1977 | Liljestrand | 55/192 X |

Primary Examiner—Robert H. Spitzer
Attorney, Agent, or Firm—Eddie E. Scott

[57] ABSTRACT

A system is provided to protect drilling fluid processing equipment from damage in shipment and in installation and operation at the work site. The drilling fluid processing equipment in the preferred embodiment of the invention consists of a pump with an elongated drive shaft supported only by bearings at the motor end, leaving the shaft housing vulnerable to bending. The pump is rotated about a support bar on a skid unit causing the elongated drive shaft and shaft housing to be lowered through an opening in the skid unit to the operating position. The pump may be inspected and/or repaired by rotating it upward through the opening. The length of shaft and shaft housing that extends through the opening may be adjusted by changing the point of rotation of the pump about the support bar.

1 Claim, 4 Drawing Figures

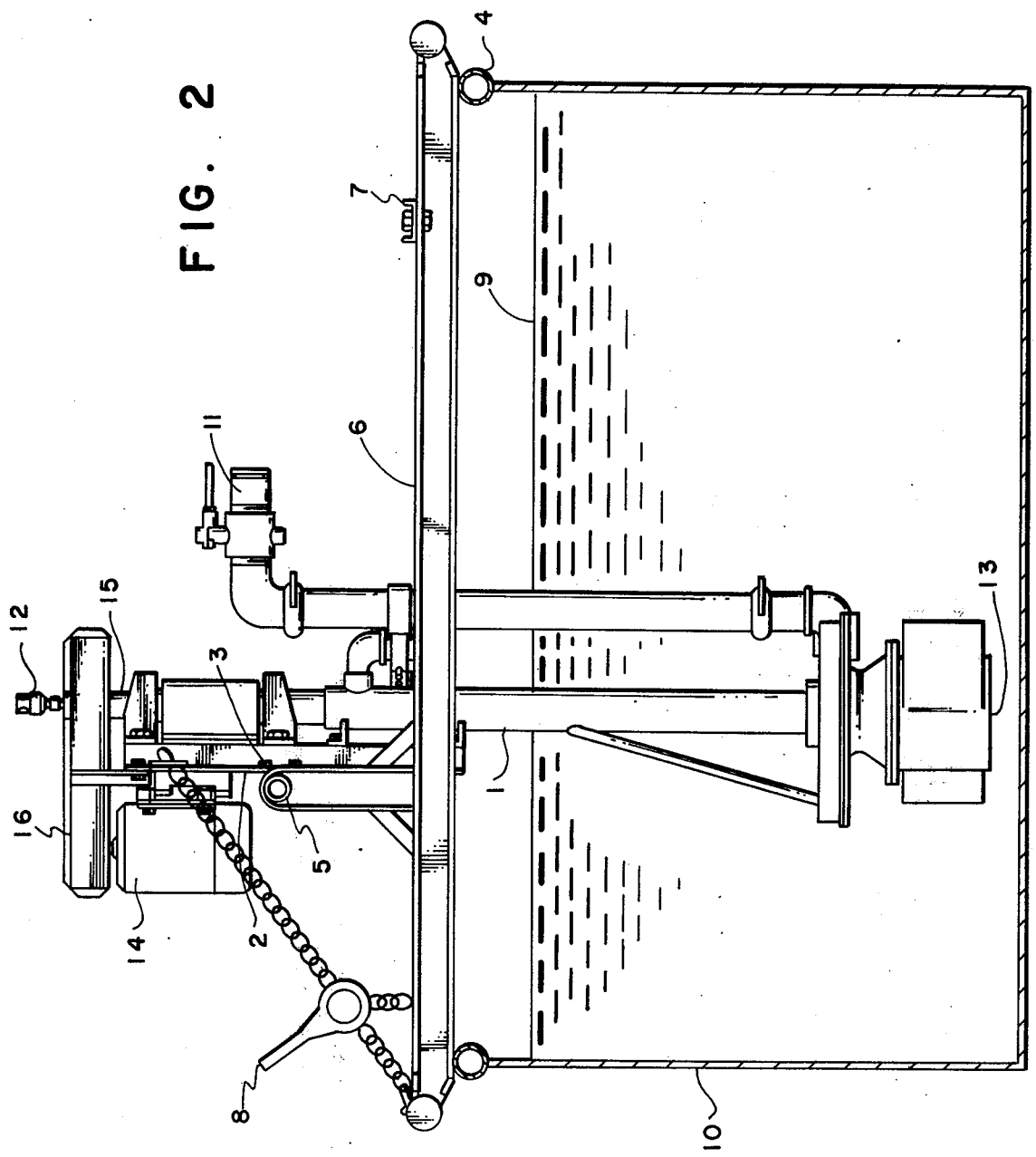

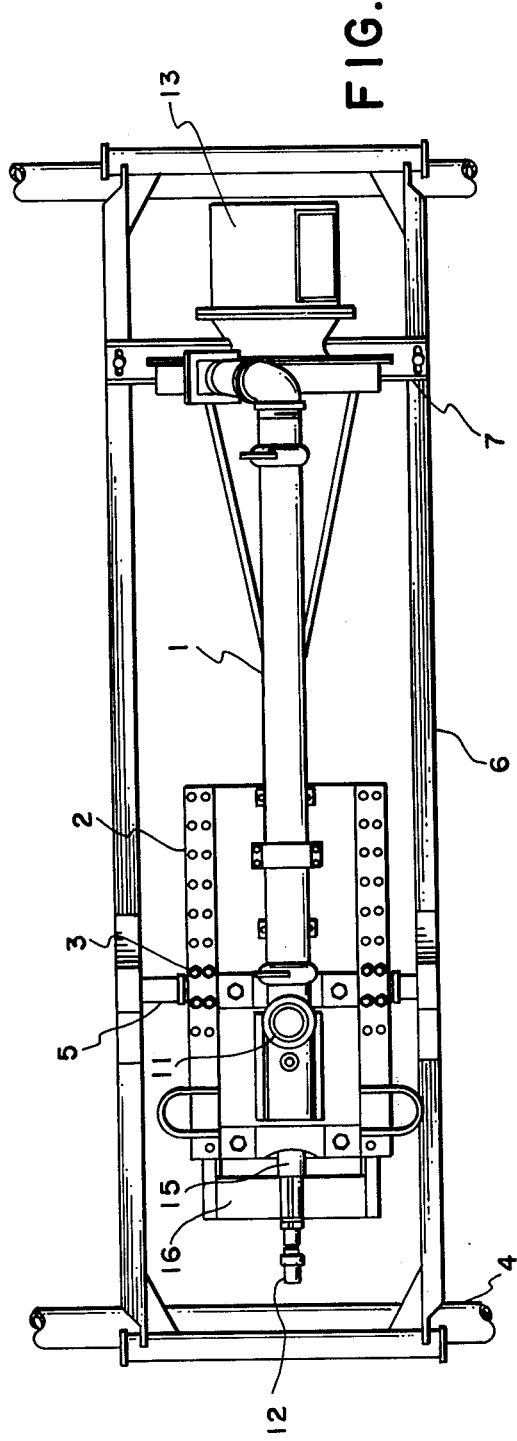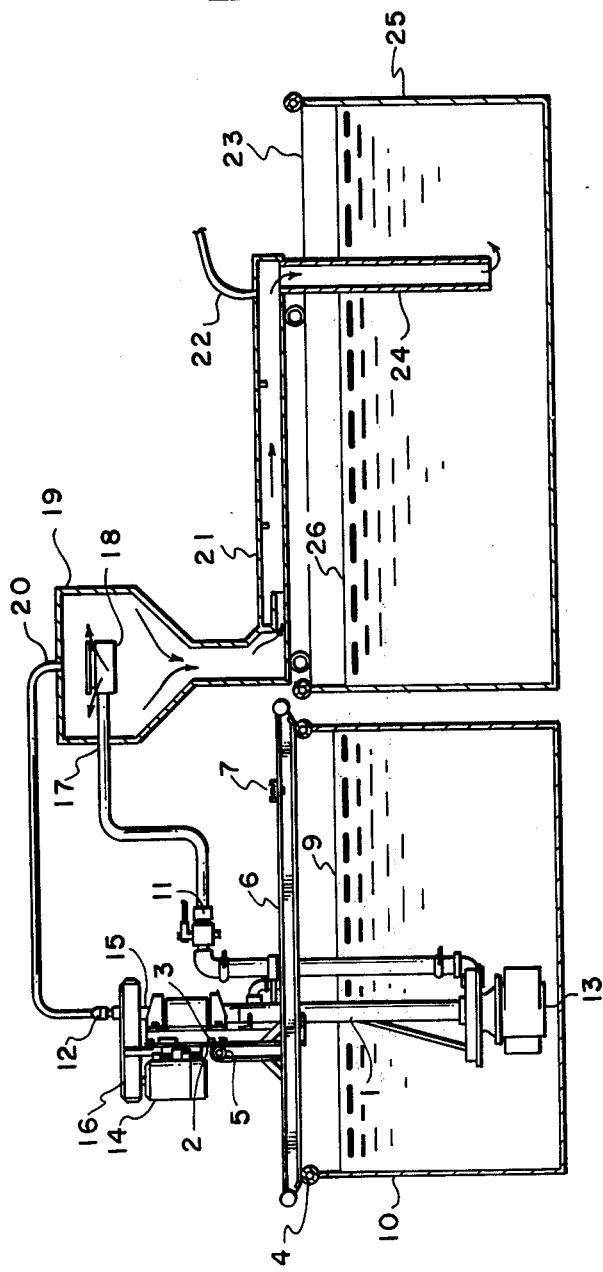

DRILLING FLUID PROCESSING SYSTEM

BACKGROUND OF THE INVENTION

The present invention relates to the art of drilling and more particularly to a drilling fluid processing system. The present invention provides a system for processing drilling fluids that includes method and apparatus for protecting the equipment during transit, that allows the equipment to be installed easily and quickly at the work site, that allows the equipment to be easily and quickly inspected and, if necessary, adjusted and/or repaired and that allows the equipment to be easily and quickly removed from the work site.

In drilling a well for oil, gas and the like, the drill bit is supported in the well bore by drill pipe. The drill pipe is hollow composed of a plurality of individual lengths of pipe connected together. The drill pipe carries drilling fluid in its interior down to and through the drill bit. The drilling fluid reaches the bottom of the well bore and passes upwardly in the annulus between the exterior surface of the drill pipe and the interior surface of the well bore to the surface and then through a return pipe to storage pits on the surface commonly referred to as mud pits.

The drilling mud is ordinarily an aqueous suspension of solid matter generally containing minerals such as bentonite and barite. The drilling mud lubricates and cools the drill bit and serves as a carrier to withdraw drill cuttings and debris from the well for disposal. The drilling mud also provides a pressure seal in the well bore to prevent the escape of gases from the well. The pressure exerted by the column of drilling mud normally is greater than the pressure which may be released upon encountering gas pockets as the well is drilled. The column of drilling mud counteracts gas pressure and prevents blowouts but very often becomes contaminated with the gases encountered during the drilling operation.

Under most circumstances it is necessary that materials such as the drill cuttings, debris and the gases be removed from the drilling mud. Since it is economically unfeasible to discard the returning drilling mud, it is necessary to process the mud to remove the drill cuttings, debris and gases and recirculate the drilling mud through the borehole. Removal of the contaminating gases is especially important because they may be poisonous or highly explosive and the release of such gases into the atmosphere would present a substantial risk to personnel in the drilling area. The presence of gases in the drilling mud decreases its weight and affects its viscosity often rendering it unsuitable for recirculation through the borehole. When gases are contained in the drilling mud being circulated through the borehole, it increases the danger of a blowout in the well.

The present invention provides a system to protect the drilling fluid processing equipment from damage in shipment and in installation and operation at the work site. The drilling fluid processing equipment in the preferred embodiment of the invention consists of a pump with an elongated drive shaft supported only by bearings at the motor end, leaving the shaft housing vulnerable to bending. The present invention simplifies installing the equipment by avoiding the necessity of providing a special high-lift hoisting unit to place the equipment in position in a pit. The present invention combines the function of a shipping skid with that of a working support when the equipment is installed and avoids duplication of accessory equipment. The present invention provides means to raise the equipment out of the drilling fluid for access for inspection and/or repair.

DESCRIPTION OF PRIOR ART

In U.S. Pat. No. 3,213,594 to A. B. Long, patented Oct. 26, 1965, a mud treating device is shown. The device includes a series of vertically-spaced perforated plates mounted inside a vertically-disposed elongated cylindrical chamber or tank. These plates are mounted for movement back and forth along the longitudinal axis of the chamber. During degassing, these plates are moved back and forth in a vibratory manner, by means of an electrically energized vibrator mounted at one end of the chamber. Gas-laden drilling mud is supplied to the upper part of the chamber, above the uppermost plate, in such a manner that it can cascade downwardly over and through the plates. Because of this cascade action, the device may be termed a "cascade mud degasser." A vacuum pump is coupled to the interior of the chamber, to subject such interior to subatmospheric pressure. The treated (gas-free) mud is withdrawn from the lower part of the chamber, below the lowermost perforated plate. The differential pressure within the chamber is automatically controlled by means of a relief valve operated by a float within a float chamber coupled to the main chamber. For purposes of transportation, between degassing operations, the chamber is pivotable on a framework to a position wherein it is horizontally disposed.

In U.S. Pat. Nos. 3,769,779 and 4,046,528 to Walter E. Liljestrand, patented Nov. 6, 1973 and Sept. 6, 1977 respectively, an apparatus is shown for degassing fluids, particularly drilling muds, comprising a vessel having an inlet and an outlet for the intake and discharge of the fluid to be treated, a centrifugal pump connected to the vessel for circulating the fluid through the vessel and means for removing gas from the region of the impeller means in the centrifugal pump. The invention also includes a centrifugal pump designed for handling gas laden fluids, the pump having a means for removing gas from the region of the pump impeller. The invention further includes a centrifugal pump for handling corrosive and/or abrasive fluids wherein said fluids are prevented from contacting the pump seal by means of a gas pressurized compartment adjacent the seal.

In U.S. Pat. No. 3,616,599 to Gerand E. Burnham, patented Nov. 2, 1971, a drilling mud degasification apparatus is shown having baffle plates in a vacuum tank over which thin films of mud are degassed as they flow downward to a receiving area of the tank. Venturi-type dual ejector apparatus is located in a sump in the tank to remove degassed mud and to draw a vacuum on the upper portion of the tank.

In U.S. Pat. Nos. 3,241,295; 3,363,404; 3,325,974 and 3,314,219 to Phil H. Griffin, III et al, mud degasser equipment is shown. The equipment includes mud degasser vacuum tank, having mud inlets and mud outlets, and means for maintaining the interior of said tanks at subatmospheric pressure.

In U.S. Pat. No. 3,249,227 to Alfred B. Long, patented May 3, 1966, a centrifugal separator is shown for the treating (mechanical processing) of slurries, and for the classification by specific gravity of solids in slurries and muds, of components of emulsions, and also for the degasification of drilling muds. It is suitable for use in the chemical, mining, and petroleum industries.

In the publication, "A Degasser You Can Understand" by Walter E. Liljestrand, presented at IADC Rotary Drilling Conference in March 1974, a description of mud degassing is summarized. "A degasser is one of several important components necessary on a rig to handle gas in mud. This paper gives perspective to the whole problem. The atmospheric degasser described is entirely new in concept. The flow is controlled by the liquid and the pump".

In U.S. Patent application Ser. No. 754,857 filed Dec. 27, 1976, gas laden drilling mud is effectively handled by a centrifugal pump system which allows the flow of released gases from the drilling mud to move in the same axial direction as the mud flow through the pump; whereupon the released gases may by conducted to safe disposal areas. A hollow centered impeller is driven by a hollow shaft through which the gases may be withdrawn. A prerotation chamber and impeller shroud below the impeller admit drilling mud into the impeller housing, providing the drilling mud with initial rotational velocity through a reduced radius, and further establishing a central opening through which gases escaping from the drilling mud will be released due to centrifugal forces on the mud. Released gases may then be removed through the central passage in the hollow shaft, which shaft may be provided with external means for preventing upward flow of fluid therearound.

In U.S. Patent application Ser. No. 754,856 filed Dec. 27, 1976, now abandoned, a degasser vessel is shown. Gas laden drilling fluid is subjected to shear and turbulence in a unique degassing vessel having a radial spray mechanism inside the vessel for emitting a continuous radial sheet of fluid spray against the inner surface of the vessel wall. Means are provided for communicating the gas in the vessel area below the radial spray with the gas in the vessel area above the radial spray. A resulting vacuum is created in the upper portion of the vessel, at least partially as a result of the radial spray action therein, and the resulting vacuum may be used in other parts of the degassing assembly for increasing the effectiveness of the degassing process.

In U.S. Patent application Ser. No. 754,855 filed Dec. 27, 1976, now U.S. Pat. No. 4,097,253, a mud degasser trough is shown. Gas laden drilling fluid is subjected to flow through a unique enclosed degasser trough to aid in the removal of entrapped gas bubbles from the fluid. A fluidic seal means is provided at each end of the trough to prevent flow of freed gas thereby, and a gas exhaust conduit is located at or near the top of the trough to allow gas removed from the fluid to be conducted to a safe disposal area.

In U.S. Pat. application Ser. No. 754,854 filed Dec. 27, 1976, now U.S. Pat. No. 4,088,457, a degasification system is shown. A unique degasifying system for removing entrapped gas bubbles from a viscous drilling fluid utilizes a hollow shaft pump having a hollow impeller, with a prerotation chamber and impeller shroud below the impeller; a spray vessel having a continuous sheet radial spray head and vacuum creating means therein; a vaccum conduit connecting the vacuum creating means to the hollow shaft of the pump; and an enclosed degasifying trough connected to the spray vessel and having fluidic seal means at each end, with a gas exhaust conduit connected thereto.

In U.S. Pat. application Ser. No. 754,853 filed Dec. 27, 1976, now U.S. Pat. No. 4,097,249, a method of degassing is shown. A method for effectively removing gas entrained in a viscous drilling fluid involves pumping the fluid with an open-center impeller pump and thereby creating a central opening in the pumped fluid into which freed gas can move coaxially with the pumped fluid; emitting the fluid in a continuous radial spray against the inner surface of the wall of a spray vessel while simultaneously creating a vacuum in the spray vessel; communicating the created vacuum area in the spray vessel with the central opening in the pumped fluid to improve gas removal and pumping efficiency in the pump; flowing the pumped fluid into an enclosed flow trough having a fluidic barrier at each end; and conducting the removed gas from the flow trough to a safe disposal area.

SUMMARY OF THE INVENTION

The present invention provides a system for processing drilling fluids including method and apparatus that protects the equipment during transit, that allows the equipment to be installed easily and quickly at the work site, that allows the equipment to be easily and quickly inspected and, if necessary, adjusted and/or repaired, and that allows the equipment to be easily and quickly removed from the work site. In the preferred embodiment of the invention a pump is provided with an elongated drive shaft supported only by bearings at the motor end, leaving the shaft housing vulnerable to bending. The pump is rotated about a support bar on a skid unit causing the elongated drive shaft and shaft housing to be lowered through an opening in the skid unit to the operating position. The pump may be inspected and/or repaired by rotating it upward through the opening. The length of shaft and shaft housing that extends through the opening may be adjusted by changing the point of rotation of the pump about the support bar. The foregoing and other objects and advantages of the present invention will become apparent from a consideration of the following detailed description of the invention when taken in conjunction with the accompanying drawings.

BRIEF DESCRIPTION OF THE DRAWINGS

FIG. 2 shows the fluid processing system being placed in the operative position.

FIG. 3 is a top view of the fluid processing system.

FIG. 4 is a side view of the fluid processing system in the operative position.

DETAILED DESCRIPTION OF THE INVENTION

Figure 1:
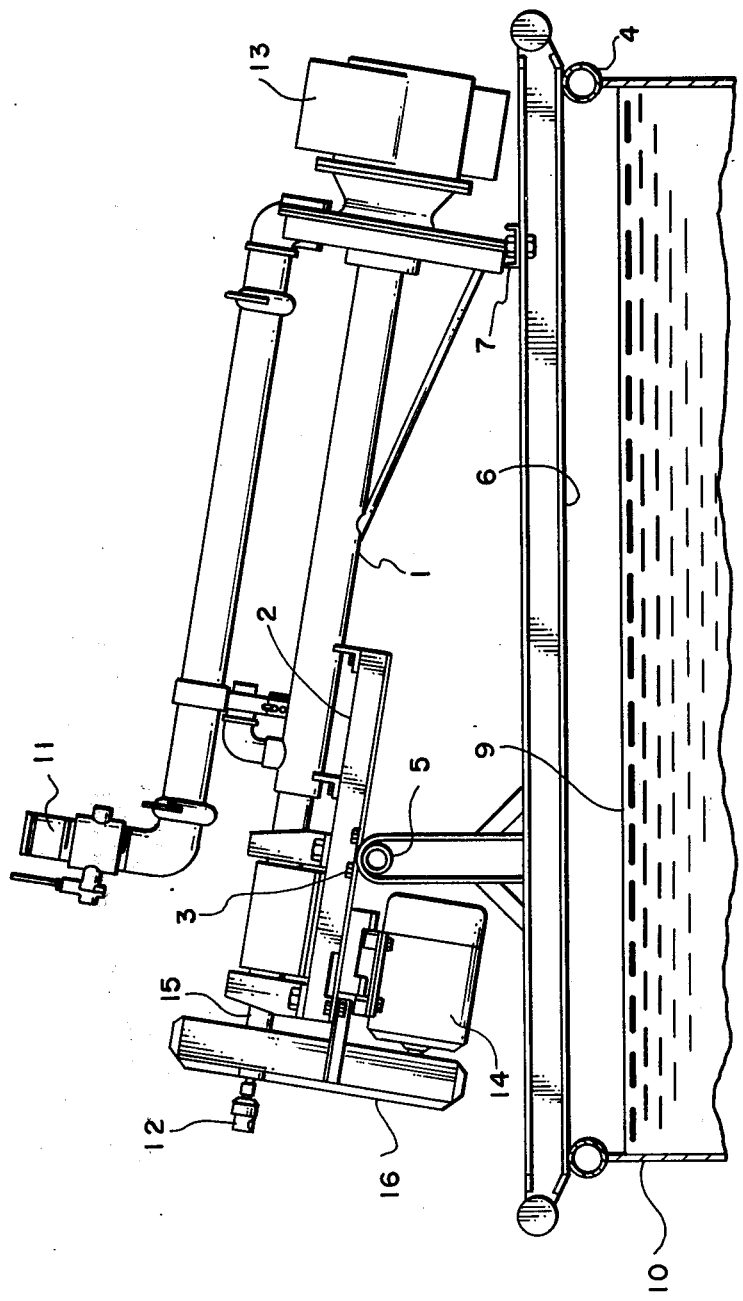
FIG. 1 illustrates a fluid processing system constructed in accordance with the present invention.

The present invention provides a system for protecting and operating drilling fluid processing equipment. A support skid is provided with a fixed horizontal support bar about which the drilling fluid processing equipment may be rotated from a horizontal shipping position to a vertical operating position by removing a second horizontal load bearing support bar under the lower end. The skid is long enough and wide enough to permit this rotation through the skid itself. Previously, the equipment had to be lifted above the mud pit, positioned and then lowered onto a separate support system. Removal to inspect and/or repair the equipment required similar hoisting equipment. Also, protecting the equipment in shipping requiring a support system on the shipping skid.

In the preferred embodiment of the present invention the drilling fluid processing equipment includes a pump with a hollow centered impeller driven by a hollow shaft through which gas may be withdrawn. A prerotation inlet chamber below the impeller admits drilling mud into the impeller housing in a peripheral flow with the realeased gas flowing from the vortex of the chamber and the impeller through the hollow drive shaft and into a conduit which leads directly to a degassing vessel. The impeller shroud gives the drilling mud additional rotational velocity through a reduced radius, further establishing a central vortex toward which any gas escaping from the fluid will be forced by the mud up the hollow impeller shaft. Released gas flows in the same axial direction through the pump as the mud. The pump has an elongated shaft supported only by bearings at the motor end, leaving the shaft housing vulnerable to bending. A support skid is provided with a fixed horizontal support bar about which the pump may be rotated from a horizontal shipping position to a vertical operating position by removing a second horizontal load bearing support bar under the lower end. The skid is long enough and wide enough to permit this rotation through the skid itself. Previously, the pump had to be lifted about eight feet about the pit, positioned and then lowered onto a separate support system. Removal to inspect the pump required similar hoisting equipment. Protecting the pump in shipping required a support system on the shipping skid to support the load imposed on the shaft housing by tie-down chains.

Referring now to the drawings and, in particular, to FIG. 1, the preferred embodiment of a drilling fluid processing system constructed in accordance with the present invention is illustrated. The embodiment of the invention shown is specifically for use with a long shaft centrifugal pump, but the same principle applies to any equipment which must be installed in a vertical position but which is more conveniently shipped in a horizontal position. In the embodiment shown in FIG. 1, a pump 1 has a height adjusting plate 2 with movable fasteners 3 in order to provide for the desired operating level below the sides 4 of a pit or other support surface. The fasteners 3 are rotatably connected to a support bar 5 of a skid 6. A removable support bar 7 is fastened to skid 6 during shipping to support the lower end of the pump 1. The pump 1 is held in a generally horizontal position as shown.

Gas contaminated drilling mud 9 from mud tank 10 will be directed to a mud spray vessel (not shown) through line 11 by the pump 1. A vacuum created in the mud spray vessel is communicated by a conduit to a top cap 12 with a rotatable seal on the top and of the hollow pump shaft of pump 1. The pumping system provides a centrifugal pump capable of pumping gas laden drilling mud while restricting the flow of contamination gases removed from the drilling mud.

The centrifugal pump 1 includes an impeller rotatably mounted on a shaft and made to rotate in impeller housing 13 by a motor 14 driving a shaft within a shaft housing 15 through a sheave and belt drive 16. A shroud section and prerotation inlet section are attached to the impeller housing 13. Fluid enters the prerotation inlet section through essentially tangential entrances, giving the fluid a circular motion in the direction of rotation of the impeller. The fluid must then pass through the shroud section to reach the impeller and in so doing it is given additional rotational velocity by the reduced radius, further establishing a central vortex through which any gas escaping from the fluid will be released toward the central longitudinal axis of the pump shaft and up the shaft. The released gases rise through the central opening in the impeller, through the hollow center of the shaft, to the conduit in top cap 12.

Fluid under pressure from the impeller rotation exits the impeller housing through an exit port but is also free to enter the space between the impeller and the top of housing 13 and into the annular space between the shaft and shaft housing. When the impeller is not in motion, the fluid level in the annulus will be that of the external fluid, but when the impeller is turning, the pressure developed could force the fluid somewhat higher in the annulus. To prevent such rise, a discharge tube may be provided through which such pressure can be relieved by venting the small flow of fluid which may migrate upward through space. Also, a double helical vane may be affixed to the outside of the impeller shaft to provide a downward impetus on any flow of fluid up the annulus or an annular dynamic seal could be located between the shaft and the housing.

Referring now to FIG. 2, the pump system is shown being placed in the operative position. After positioning the skid 6 in the proper location, a small chain hoist 8 is used to rotate the equipment upward around bar 5 until it is above bar 7. Bar 7 is then removed. The chain hoist is then used to lower the bottom end of the pump until the pump is vertical. In the shipping configuration shown in FIG. 1, the pump 1 can be pulled or skidded onto the pit and into position. Resetting of the height adjustment (or depth adjustment) can be accomplished easily with the equipment in the shipping position. Should it become necessary to inspect and/or repair the pumping equipment during operation, the chain hoist 8 can be reconnected and the pump rotated about bar 5 until the pumping system is in position for inspection and/or repair. The height adjustment may also be reset by this operation.

Referring now to FIG. 3, a top view of the drilling fluid processing system or the present invention is shown. The skid 6 is long enough and wide enough to permit rotation of the pump 1 about bar 5. In the position shown in FIG. 3, the equipment is ready for transportation, inspection and/or repair. In order to place the equipment in the operative position, the chain hoist 8 as shown in FIG. 2 is connected and the pump 1 is raised off of support bar 7. Support bar 7 is removed and the pump 1 is lowered into the operative position using the chain hoist 8. Reversal of the foregoing steps allows the pump 1 to be removed from the drilling mud and placed in a position for transportation, inspection and/or repair.

Referring now to FIG. 4, the operation of the fluid processing system is illustrated. Gas contaminated drilling mud 9 from mud tank 10 is directed to a mud spray vessel 19 through line 17 by the pump system 1. A vacuum created in vessel 19 is communicated by conduit 20 to the top cap 12 with a rotatable seal on the top end of the hollow pump shaft of pump 1. Mud is pumped via line 17 through the wall of vessel 19 and is sprayed outward through spray head 18 where it impinges the wall of vessel 19 and moves downward, out the bottom discharge tube. From the tube the mud passes into the gas separation trough 21 and flows down the trough under a float-operated gate, down the return pipe 24 and into degassed mud tank 25.

The structural details of a drilling fluid processing system constructed in accordance with the present invention having been described, the operation of the system will now be considered. The pump 1 is transported to the work site as shown in FIG. 1. The skid 6 will protect the equipment mounted on it from damage in shipping and in installation at a work site. The equipment to be protected consists of the cenrifugal pump 1 with an elongated shaft supported only by bearings at the motor end, leaving the shaft housing vulnerable to bending. Installing the equipment is simplified avoiding the necessity of providing a special high-lift hoisting unit to place it in position in a pit. The function of a shipping skid and a working support when the equipment is installed are combined to avoid duplication of accessory equipment. The present invention provides a means to raise the pump out of the fluid for access for inspection and repair and for height adjustment.

In typical operation, the equipment shown in FIG. 4 is assembled at a well drilling site and placed on the mud tanks 10 and 25. The motorized pump 1 is transported on skid 6. The drilling fluid is pumped into the tank 10 from the well preferably through a device which removes solids such as rock cuttings and sand from the drilling mud.

The pump motor 14 is started and fluid is drawn into the tangential inlets in chamber 13 and upward through the shroud whereupon it is expelled through the discharge port by the impeller. A central vortex is formed in the center of the hollow impeller member and gas bubbles which become separated from the mud in the centrifugal pump are moved inwardly by the action of the heavier mud being moved outward in response to the centrifugal forces imposed on it by the pump impeller. The separated gas moves upward through the hollow center of the pump shaft and out through the top of the hollow shaft which is sealingly covered by the top cap 12.

The pumped mud moves out discharge port 11 into conduit 17 and thence upward into spray vessel 19. At spray vessel 19, the mud moves through collar 18. The high pressure mud is forcefully emitted through a narrow gap against a deflector plate forming a circular spray outward against the inside surface of the outer wall of vessel 19. This spray of fluid forms a "doughnut" shape having an open central portion.

The action of the spray outward against the wall of the vessel establishes a strong vacuum in the upper portion of the vessel above the spray. The action of the fluid serves to place the fluid in high turbulence and shear which results in a combining of many small entrained gas bubbles into larger bubbles. The reason for the creation of the high vacuum in the upper part in the chamber appears to be a result of the venturi effect of the spray outward and the open central passage.

This creation of a high vacuum is very beneficial to drawing the small bubbles in the fluid together and out of the fluid. The vacuum is also beneficial by its effect on the centrifugal pump 1. The vacuum communicates with the pump 1 through conduit 20. This action serves to further draw off the gas separated in the pump 1. The vacuum further enhances the efficiency of the pump by reducing the so-called vapor lock and cavitation effects in the impeller area and by further aiding in the intake of fluid into the pump as a result of this vacuum.

Thus, the created vacuum in the upper portion of the vessel is a multi-purpose advantage. It aids in the combination of small bubbles into large bubbles; it aids in drawing the entrapped gas bubbles from the fluid both in the vessel 19 and in the impeller area of the pump 1; and it further increases the efficiency of the centrifugal pump 1 in one or more ways.

The mud is emitted in a continuous sheet and impinges on the wall of vessel 19, and flows downward therealong until it reaches the discharge tube from which it passes into the intake of the separator trough 21.

Although a specific preferred embodiment of the present invention has been described in the detailed description above, the description is not intended to limit the invention to the particular forms of embodiments disclosed therein since they are to be recognized as illustrative rather than restrictive and it will be obvious to those skilled in the art that the invention is not so limited. Thus, the invention is declared to cover all changes and modifications of the specific example of the invention herein disclosed for purposes of illustration which do not constitute departure from the spirit and scope of the invention.

The embodiments of the invention in which an exclusive property or privilege is claimed are defined as follows:

1. An apparatus for processing drilling fluid at a work site that includes a mud pit containing drilling mud, comprising:
    a skid unit adapted to be placed over said mud pit above said drill mud;
    an opening in said skid unit;
    a first support bar on said skid unit positioned above said opening;
    a pump having an elongated drive shaft having an upper end and a lower end;
    hinge means located at a position along said drive shaft between said upper and lower ends rotatably connecting said pump to said first support bar to allow said pump to be rotated about said first support bar from a generally horizontal shipping position to a generally vertical operating position with a portion of said elongated drive shaft extending through said opening into said mud pit and said drilling mud to a non-vertical inspection and repair position; and a second support bar for supporting said pump during shipping.

* * * * *